(12) United States Patent  
Chavan

(10) Patent No.: US 7,020,608 B2
(45) Date of Patent: Mar. 28, 2006

(54) SPEECH RECOGNITION HANDLING WITH SYNTHESIZED MANUAL INPUT EVENTS

(75) Inventor: Sagarika A. Chavan, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 681 days.

(21) Appl. No.: 09/885,157

(22) Filed: Jun. 21, 2001

(65) Prior Publication Data

US 2003/0018474 A1 Jan. 23, 2003

(51) Int. Cl.
*G10L 21/06* (2006.01)

(52) U.S. Cl. .......................................... 704/270; 701/1
(58) Field of Classification Search ................ 704/270, 704/270.1, 275; 701/1, 36; 307/10.1; 342/357.1; 379/88.01
See application file for complete search history.

(56) References Cited

U.S. PATENT DOCUMENTS

| | | | |
|---|---|---|---|
| 5,488,652 A | 1/1996 | Bielby et al. | 379/88 |
| 5,602,963 A * | 2/1997 | Bissonnette et al. | 704/275 |
| 6,173,266 B1 | 1/2001 | Marx et al. | 704/270 |
| 6,240,347 B1 * | 5/2001 | Everhart et al. | 701/36 |
| 6,420,975 B1 * | 7/2002 | DeLine et al. | 340/815.4 |
| 6,526,335 B1 * | 2/2003 | Treyz et al. | 701/1 |

* cited by examiner

*Primary Examiner*—Susan McFadden
(74) *Attorney, Agent, or Firm*—Stefan V. Chmielewski

(57) ABSTRACT

A voice responsive system controls a device in response to both a manual input and a voice input. The system includes a processor, a memory system coupled to the processor and processor executable code. The processor executable code includes an operating system and a voice recognition application for causing the processor to perform a number of steps. Initially, a voice message is provided from the operating system to the voice recognition application. Next, an appropriate simulated manual input event is provided from the voice recognition application to the operating system in response to the received voice message. Then, an appropriate manual input event message is provided from the operating system to the voice recognition application in response to the simulated manual input event. The voice recognition application then initiates control of the device responsive to the manual input event message.

21 Claims, 4 Drawing Sheets

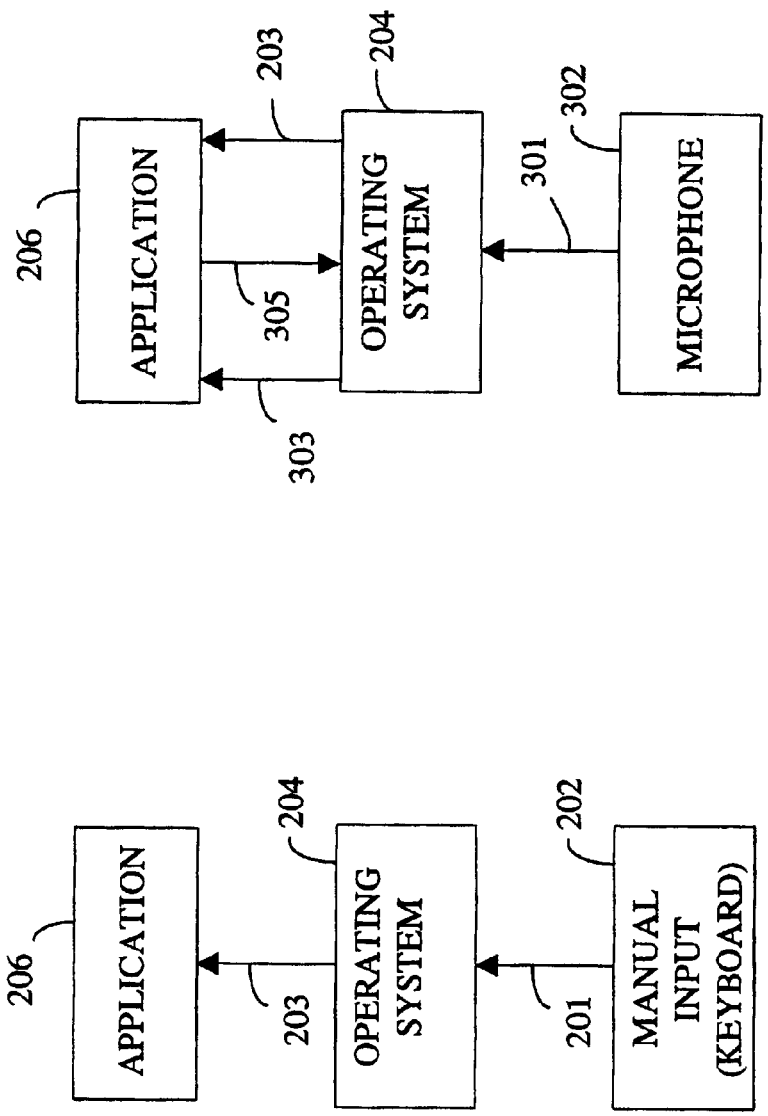

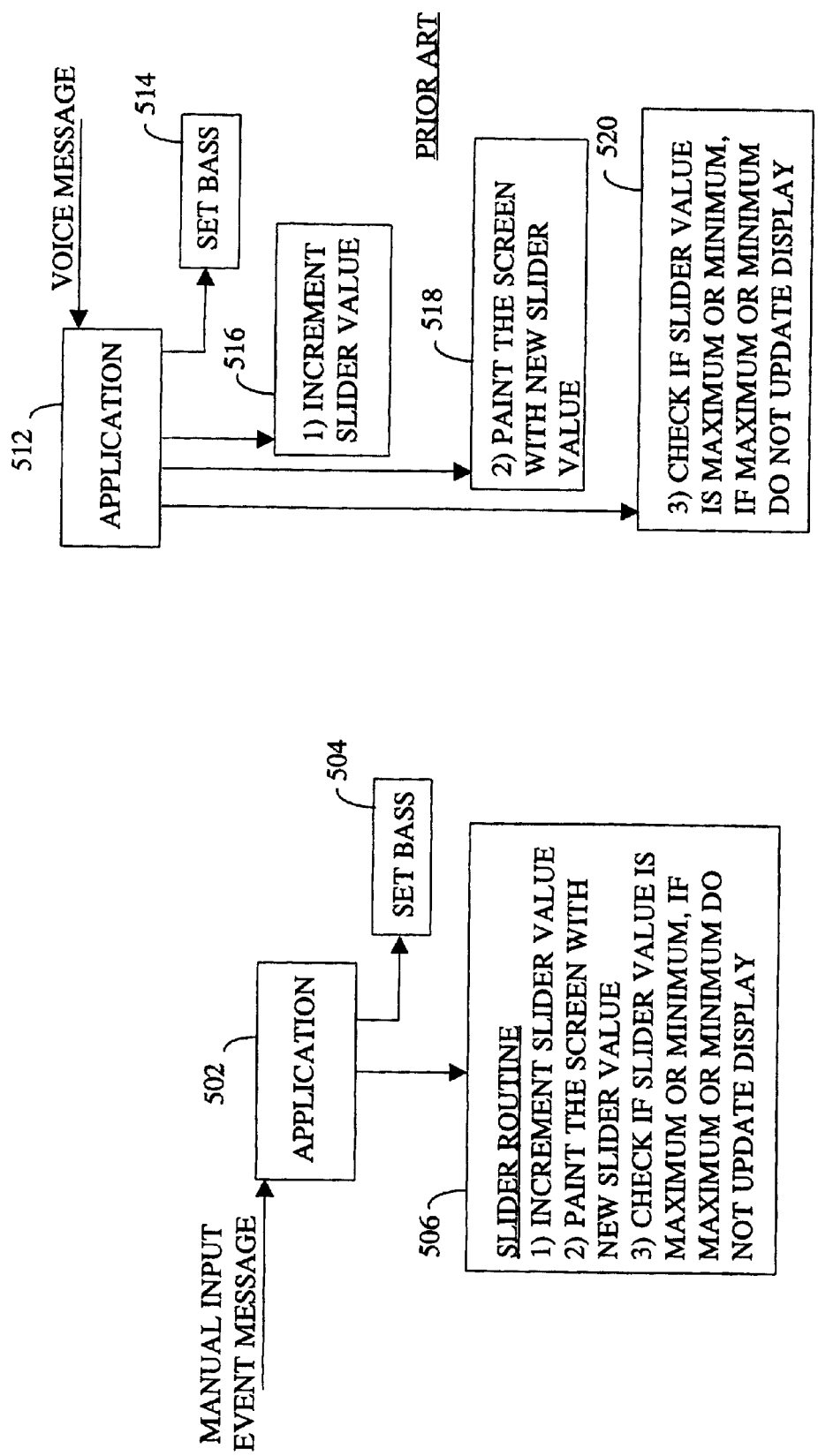

SPEECH RECOGNITION HANDLING WITH SYNTHESIZED MANUAL INPUT EVENTS

TECHNICAL FIELD

The present invention is generally directed to speech recognition and, more specifically, to synthesizing manual input events within a speech recognition driven system.

BACKGROUND OF THE INVENTION

As is well known to one of ordinary skill in the art, speech recognition is a field in computer science that deals with designing computer systems that can recognize spoken words. A number of speech recognition systems are currently available (e.g., products are offered by IBM, Dragon Systems and Philips). Traditionally, speech recognition systems have only been used in a few specialized situations due to their cost and limited functionality. For example, such systems have been implemented when a user was unable to use a keyboard to enter data because the user's hands were disabled. Instead of typing commands, the user spoke into a microphone. However, as the cost of these systems has continued to decrease and the performance of these systems has continued to increase, speech recognition systems are being used in a wider variety of applications (as an alternative to or in combination with keyboards or other user interfaces). For example, speech actuated control systems have been implemented in a motor vehicle to control various automotive accessories within the motor vehicle.

A typical speech recognition system, that is implemented in a motor vehicle, includes voice processing circuitry and memory for storing data representing command words (that are employed to control various vehicle accessories). In a typical system, a microprocessor is utilized to compare the user provided data (e.g., voice input) to stored speech models to determine if a word match has occurred and provide a corresponding control output signal in such an event. The microprocessor has also normally controlled a plurality of motor vehicle accessories, e.g., a cellular telephone and a radio. Such systems have advantageously allowed a driver of the motor vehicle to maintain vigilance while driving the vehicle.

In a typical computer system, various software applications may receive notification about keyboard events, such as, a key press, a key hold and/or a key release, via a message provided by an operating system. In response to these messages, an appropriate task is usually initiated by one or more of the applications. Today, many voice recognition applications include separate code, which allows the application to receive both voice and manual input (for example, the manual input may be provided by a switch, a push-button or a rotary dial). This has allowed a user of the speech recognition system to also manually (as opposed to verbally) provide input to the system. However, such systems have typically required increased development time to write and prove-in their voice recognition applications as the applications have to perform a sequence of additional calls to achieve full application level functionality.

What is needed is a speech recognition system that includes a voice recognition application that does not require additional calls to handle a voice input.

SUMMARY OF THE INVENTION

According to the present invention, a voice responsive system controls a device in response to both a manual input and a voice input. The system includes a processor, a memory subsystem coupled to the processor and processor executable code. The processor executable code includes an operating system and a voice recognition application for causing the processor to perform a number of steps. Initially, a voice message is provided from the operating system to the voice recognition application. Next, an appropriate simulated manual input event is provided from the voice recognition application to the operating system in response to the received voice message. Then, an appropriate manual input event message is provided from the operating system to the voice recognition application in response to the simulated manual input sevent. The voice recognition application then initiates control of the device responsive to the manual input event message.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 2 is a block diagram illustrating the flow of information from a hardware device to an operating system and a voice recognition application;

FIG. 3 is a block diagram depicting the flow of information from a microphone to an operating system and a voice recognition application;

FIG. 5A depicts an exemplary block diagram illustrating the execution of calls to perform a function, according to an embodiment of the present invention; and FIG. 5B depicts an exemplary block diagram illustrating the execution of calls to perform the function of FIG. 5A, according to the prior art.

DESCRIPTION OF THE PREFERRED EMBODIMENTS

The present invention is directed to a speech recognition system that synthesizes a manual input event within a voice recognition application. When the application receives a voice message (e.g., a voice command), the application uses an operating system call function to simulate an appropriate manual input event, e.g., a key press, a key hold or a key release, and thereby provide a simulated manual input event to the operating system. In response to receiving the simulated manual input event (via the system call function), the operating system provides an appropriate manual input event message to the application. Upon receiving the manual input event message, the application implements a task that corresponds to the manual input event message, such as, changing the station on a radio. In this manner, the application uses the same code to initiate implementation of a task associated with a manual input and a voice input that corresponds to the manual input.

Figure 1:
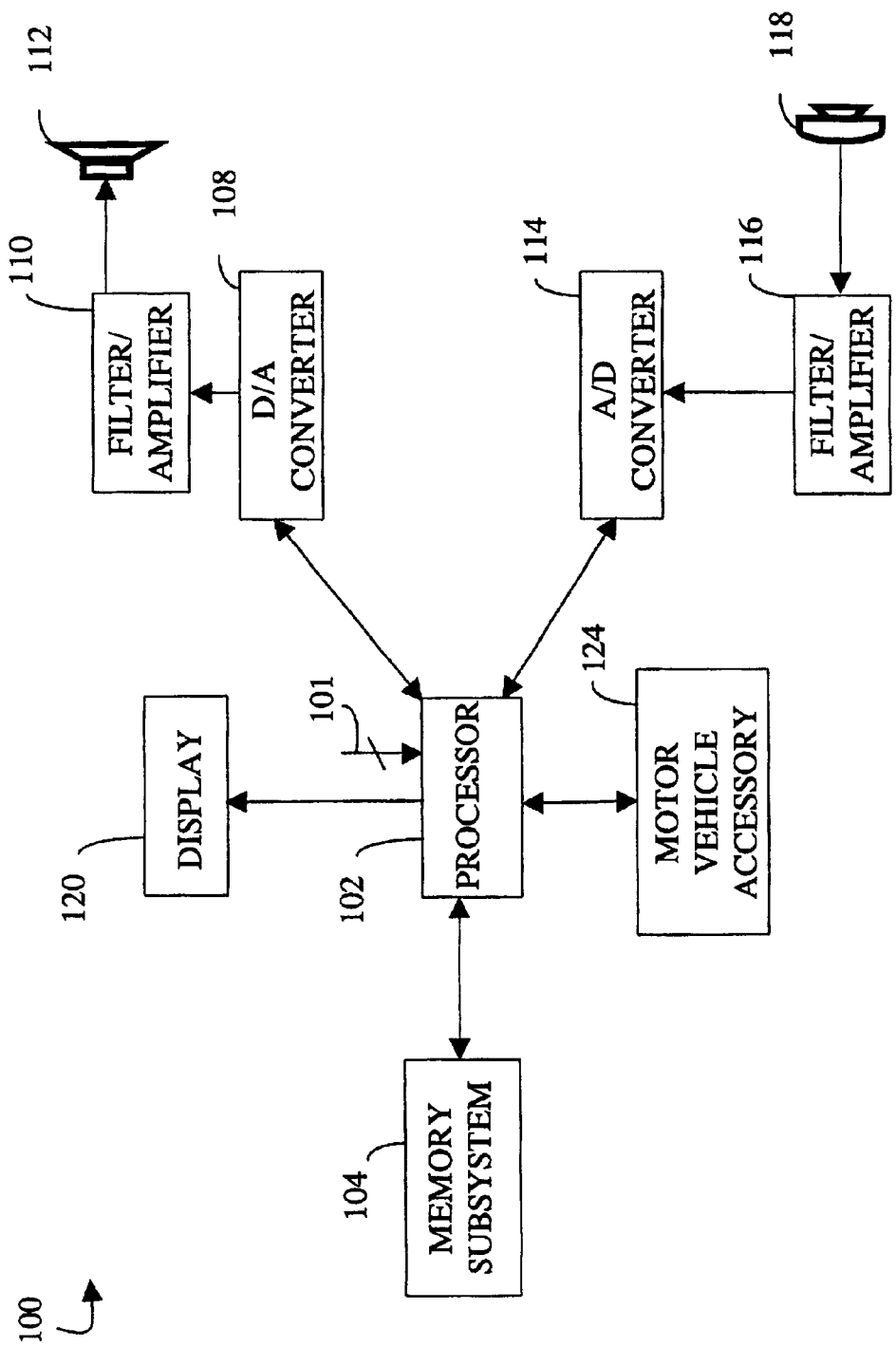
FIG. 1 is a block diagram of an exemplary speech recognition system implemented in a motor vehicle.

FIG. 1 depicts a block diagram of an exemplary speech recognition system 100 (implemented within a motor vehicle) that handles an exemplary manual input 101 and a voice input with the same code, according to an embodiment of the present invention. The system 100 includes a processor 102 coupled to a motor vehicle accessory (e.g., a radio) 124 and a display 120. The processor 102 controls the motor vehicle accessory 124 as dictated by a voice input or the manual input 101, supplied by a user of the system 100. The processor 102 also supplies various information to the display 120, to allow a user of the motor vehicle to better utilize the system 100. In this context, the term processor may include a general purpose processor, a microcontroller (i.e., an execution unit with memory, etc., integrated within a single integrated circuit) or a digital signal processor. The processor 102 is also coupled to a memory subsystem 104. The memory subsystem 104 includes an application appropriate amount of main memory (volatile and non-volatile).

An audio input device 118 (e.g., a microphone) is coupled to a filter/amplifier module 116. The filter/amplifier module 116 filters and amplifies the voice input provided by the user through the audio input device 118. The filter/amplifier module 116 is also coupled to an analog-to-digital (A/D) converter 114. The A/D converter 114 digitizes the voice input from the user and supplies the digitized voice to the processor 102 (which may cause the voice input to be compared to system recognized commands).

The processor 102 may execute various routines in determining whether a voice or manual input corresponds to a system recognized message (i.e., command). The processor 102 may also cause an appropriate voice output to be provided to the user (ultimately through an audio output device 112). When implemented, the synthesized voice output is provided by the processor 102 to a digital-to-analog (D/A) converter 108, which is coupled to a filter/amplifier section 110, which amplifies and filters the analog voice output. The amplified and filtered voice output is then provided to the audio output device 112 (e.g., a speaker). While only one manual input 101 and one motor vehicle accessory 124 are shown, it is contemplated that any number of manual inputs and accessories, typically provided in a motor vehicle (e.g., a cellular telephone or a radio and their corresponding manual inputs), can be implemented.

FIG. 2 depicts a block diagram illustrating the transfer of information between a manual input device (e.g., a keyboard, a switch, a push-button or a rotary dial, etc.) 202, an operating system (e.g., Windows CE) 204 and a voice recognition application 206. As depicted in FIG. 2, when the manual input device 202 is actuated, a manual input event 201 is provided to the operating system 204. In response to the manual input event 201, the operating system 204 provides a manual input event message 203 to the application 206. The application 206 then initiates performance of a task that corresponds to the manual input event message 203.

FIG. 3 depicts a microphone 302 providing a voice input to the operating system 204, which is in communication with the application 206. The microphone 302 receives a voice input from a user and provides a voice event 301 to the operating system 204. In response to the voice event 301, the operating system 204 provides a voice message 303 to the application 206. In response to the voice message 303, the application 206 simulates a manual input event and provides a simulated manual input event 305 to the operating system 204. In response to the simulated manual input event 305, the operating system 204 provides a manual input event message 203 to the application 206. In response to the manual input event message 203, the application 206 initiates performance of an appropriate task, such as implementing a scan function on a radio located within the motor vehicle.

Thus, in the above described system, the application 206, instead of replicating the code corresponding to the manual input, simply generates a simulated manual input event 305 in response to the voice message 303. In this manner, the application 206 is not required to duplicate the code for responding to both a manual input event message 203 and a voice message 303. This is advantageous in that code replication within the application is avoided. Thus, the application uses the same code to initiate a response to a voice message 303 and a manual input (i.e., hardware) event message 203. In a preferred embodiment, the application generates simulated manual input events 305 through the use of a system call function (e.g., keybd_event) to simulate a particular manual input, e.g., a key press, a key hold and/or a key release. Exemplary voice recognition application C++code for generating a simulated manual input event 305, according to the present invention, is set forth below:

```
case WM_SPCH_RECOG: {
// NKDbgPrintfW(TEXT("RADIO VOICE REC HOOKS: WM_SPCH_RECOG\n "));
    switch (lParam) {
        case IDVMI_RADIO_TUNEUP: {
        // NKDbgPrintfW(TEXT("RADIO VOICE REC HOOKS: Tune right\n "));
        // Key event generated from within app.
            keybd_event(VK_RIGHT,1,0,0);
            return S_OK;
        }
        case IDVMI_RADIO_TUNEDOWN: {
        // NKDbgPrintfW(TEXT("RADIO VOICE REC HOOKS: Tune left\n "));
            keybd_event(VK_LEFT,1,0,0);
            return S_OK;
        }
        case IDVMI_RADIO_SEEKUP: {
        // NKDbgPrintfW(TEXT("RADIO VOICE REC HOOKS: Seek up\n "));
            keybd_event(VK_UP,1,KEYEVENTF_KEYUP,0);
            return S_OK;
        }
        case IDVMI_RADIO_SEEKDOWN: {
        // NKDbgPrintfW(TEXT("RADIO VOICE REC HOOKS: Seek down\n "));
            keybd_event(VK_DOWN,1,KEYEVENTF_KEYUP,0);
            return S_OK;
        }
        // Multiple key events can also be generated
        // in a predetermined sequence.
        case IDVMI_RADIO_SCANUP: {
            keybd_event(VK_UP,1,0,0);
            keybd_event(VK_UP,1,0,0);
            keybd_event(VK_UP,1,0,0);
            keybd_event(VK_UP,1,0,0);
            keybd_event(VK_UP,1,0,0);
            keybd_event(VK_UP,1,KEYEVENTF_KEYUP,0);
        // NKDbgPrintfW(TEXT("RADIO VOICE REC HOOKS : SCAN Up\n "));
            return S_OK;
        }
        case IDVMI_RADIO_SCANDOWN: {
            keybd_event(VK_DOWN,1,0,0);
            keybd_event(VK_DOWN,1,0,0);
            keybd_event(VK_DOWN,1,0,0);
            keybd_event(VK_DOWN,1,0,0);
            keybd_event(VK_DOWN,1,0,0);
            keybd_event(VK_DOWN,1,KEYEVENTF_KEYUP,0);
        // NKDbgPrintfW(TEXT("RADIO VOICE REC HOOKS : SCAN down\n "));
            return S_OK;
        }
        case IDVMI_RADIO_PRESET1: {
            keybd_event(VK_APCSOFTKEY1,1,0,0);
            keybd_event(VK_APCSOFTKEY1,1,KEYEVENTF_KEYUP,0);
```

-continued

```
// NKDbgPrintfW(TEXT("AUDIO VOICE REC
HOOKS: TREBLE Up\n "));
    return S_OK;
}
case IDVML_RADIO_PRESET2: {
    keybd_event(VK_APCSOFTKEY2,1,0,0);
    keybd_event(VK_APCSOFTKEY2,1,KEYEVENTF_K
EYUP,0);
// NKDbgPrintfW(TEXT("AUDIO VOICE REC
HOOKS: TREBLE Up\n "));
    return S_OK;
}
case IDVML_RADIO_PRESET3: {
    keybd_event(VK_APCSOFTKEY3,1,0,0);
    keybd_event(VK_APCSOFTKEY3,1,KEYEVENTF_K
EYUP,0);
// NKDbgPrintfW(TEXT("AUDIO VOICE REC
HOOKS: TREBLE Up\n "));
    return S_OK;
}
case IDVML_RADIO_PRESET4: {
    keybd_event(VK_APCSOFTKEY4,1,0,0);
    keybd_event(VK_APCSOFTKEY4,1,KEYEVENTF_K
EYUP,0);
// NKDbgPrintfW(TEXT("AUDIO VOICE REC
HOOKS: TREBLE Up\n "));
    return S_OK;
}
case IDVML_RADIO_PRESET5: {
    keybd_event(VK_APCSOFTKEY5,1,0,0);
    keybd_event(VK_APCSOFTKEY5,1,KEYEVENTF_K
EYUP,0);
// NKDbgPrintfW(TEXT("AUDIO VOICE REC HOOKS
: TREBLE Up\n "));
    return S_OK;
}
case IDVML_ONE:
case IDVML_TWO:
case IDVML_THREE:
case IDVML_FOUR:
case IDVML_FIVE:
case IDVML_SIX:
case IDVML_SEVEN:
case IDVML_EIGHT:
case IDVML_NINE:
case IDVML_ZERO:
{
    // Select the spoken preset number
    dwaDirect[index] = GetNumber(lParam);
    if (dwaDirect[index] == -1)
    {
        return S_FALSE;
    }
    // NKDbgPrintfW(TEXT("Stored Voice
Number %d in index %d\n "),dwaDirect[index],index);
    index ++;
    if (index > = 6)
    {
        // NKDbgPrintfW(TEXT("Index Maxed out
:: %d\n "),index);
        index = 0; pointindex = 0;
    }
    // check if array filled
    if (pointindex! = 0)
    {
    // yes tune
        DWORD dwFreq = DtrmnFreq( );
        // NKDbgPrintfW(TEXT("Voice
Frequency = %d\n "),dwFreq);
        if((dwFreq <= 87700) || (dwFreq
>= 107900))
        {
            WCHAR wch[45];
            wsprintf(wch, L"Invalid Frequency, Try
Again!!");
            BSTR bstr = SysAllocString(wch);
            m_Speech-> Speak(bstr, 0);
            SysFreeString(bstr);
// NKDbgPrintfW(TEXT("Invalid
frequency try again %d\n "));
        }
        else
        {
            // NKDbgPrintfW(TEXT("Tuning to %d\n
"),dwFreq);
                m_pRadio-> Tune(dwFreq);
        }
        index = 0; pointindex = 0;
    }
    return S_OK;
}
case IDVML_VPOINT:
{
    // NKDbgPrintfW(TEXT("POINT stored %d\n "),index);
    pointindex = index;
    index ++;
}
default:
    if (index > 5)
    {
        // NKDbgPrintfW(TEXT("Index Maxed out::
%d\n "),index);
        index = 0; pointindex = 0;
    }
    break;
    }
}
```

Figure 4:
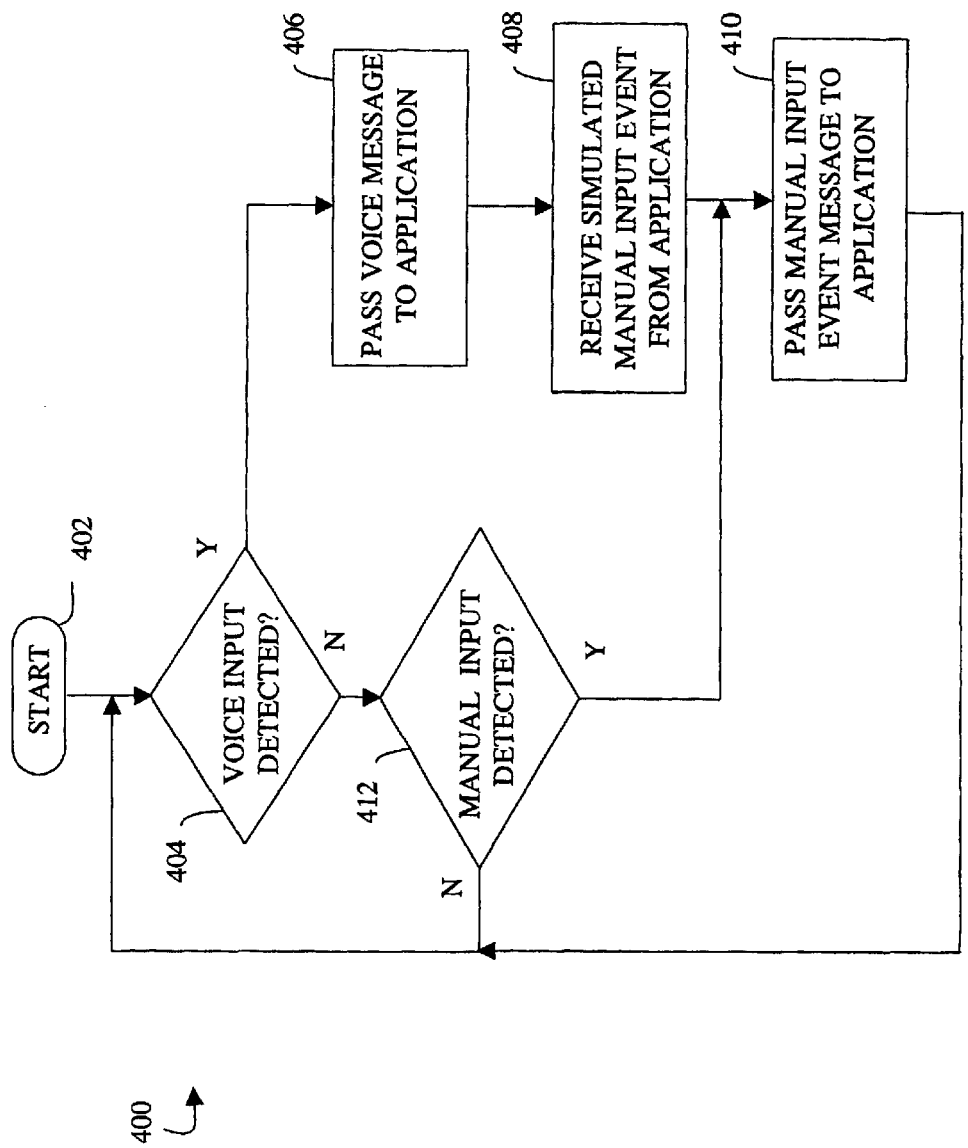
FIG. 4 is a flowchart depicting a transfer routine for transferring information between an operating system and a voice recognition application.

Turning to FIG. 4, a flowchart of an information transfer routine 400 is depicted. In step 402 the routine 400 is initiated at which point control transfers to decision step 404. In decision step 404, the processor 102, executing an operating system 204, determines whether a voice input is detected. If so, control transfers from step 404 to step 406 where a voice message 303 is passed from the operating system 204 to a voice recognition application 206. Next, in step 408, the application 206 provides a simulated manual input event 305 to the operating system 204. Then, in step 410, the operating system 204 passes a manual input event message 203 to the application 206 at which point control transfers to step 404.

In step 404, when the processor 102 does not detect a voice input, control transfers to decision step 412. In step 412, the processor 102 determines whether a manual input is detected. If so, control transfers from step 412 to step 410 where the operating system 204 passes a manual input event message 203 to the application 206. In step 412, when a manual input is not detected, control transfers to step 404. Thus, a routine has been described which illustrates the flow of information between an operating system and a voice recognition application, according to an embodiment of the present invention.

FIGS. 5A–5B depict exemplary block diagrams illustrating the execution of calls to perform a function associated with a voice event according to an embodiment of the present invention and according to the prior art, respectively. As shown in FIG. 5A, in response to a simulated manual input event (provided from a voice application 502 to an operating system), a manual input event message is provided by the operating system to the application 502. In response to the manual input event message, the application 502 initiates the performance of an appropriate task. For example, when a user has chosen to adjust the bass of a radio, the application 502 calls a set bass routine 504. The application 502 also calls a slider routine 506, which performs a number of tasks associated with updating a display of the radio. The slider routine 506 increments a slider value, paints the screen with a new slider value and checks if the new slider value is at a maximum or minimum slider value and, if so, does not update the display.

According to the prior art, as shown in FIG. 5B, a voice application 512 receives a voice message from the operating system. In response to the voice message, the application 512 calls a routine, for example, a set bass routine 514. To update an associated display, the application 512 must also call a first routine 516, which increments a slider value. Upon returning from the call of routine 516, the application 512 calls a second routine 518, which paints the screen with a new slider value. Upon returning from the call of routine 518, the application 512 then calls a third routine 520 to determine if the new slider value is at a maximum or minimum slider value. If the maximum or minimum slider value has been reached, then the routine 520 does not update the display before returning to the application 512. It should be appreciated that in implementing such an audio function, according to the prior art, a voice message received by the application is handled in multiple steps. However, according to the present invention, when a voice event is initiated, the voice application 502 provides a simulated manual input event to the operating system. The operating system then responds by providing a manual input event message to the application 502. The application 502 then updates the display by calling a slider routine 506, which is a building block that handles the call independently without requiring the application 502 to further track the process. In contrast, as shown in FIG. 5B, the application 512 is required to track each step of the display update process when a voice message is received.

Accordingly, a voice responsive system has been described that initiates control of a device in response to both a manual input and a voice input. The voice responsive system includes a voice recognition application that can initiate a task corresponding to a manual input or a corresponding voice input using the same code. This advantageously reduces the amount of code within the application. The voice responsive system, when implemented within a motor vehicle, advantageously allows an occupant of the vehicle to control various motor vehicle accessories, using both manual input and voice input. Further, reducing the amount of code decreases memory requirements and, as such, reduces the cost of implementing the voice recognition application within an automotive environment (e.g., within a motor vehicle).

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method for providing manual input and voice input functionality in a voice responsive system, the voice responsive system implementing an operating system and a voice recognition application that are in communication, the method comprising the steps of:
   providing a voice message from the operating system to the voice recognition application;
   providing an appropriate simulated manual input event from the voice recognition application to the operating system in response to the received voice message; and
   providing an appropriate manual input event message from the operating system to the voice recognition application in response to the simulated manual input event, wherein the voice recognition application initiates the performance of a task associated with the manual input event message.

2. The method of claim 1, wherein the voice message is provided by the operating system in response to a voice input.

3. The method of claim 1, wherein the simulated manual input event is generated by a system call function.

4. The method of claim 3, wherein the system call function synthesizes a hardware input.

5. The method of claim 3, wherein the operating system is a Windows CE operating system and the system call function is a keybd_event function.

6. The method of claim 1, wherein the operating system is a Windows CE operating system.

7. A voice responsive system that controls a device in response to both a manual input and a voice input, the system comprising:
   a processor;
   a memory subsystem for storing information coupled to the processor; and
   processor executable code including an operating system and a voice recognition application for causing the processor to perform the steps of:
      providing a voice message from the operating system to the voice recognition application;
      providing an appropriate simulated manual input event from the voice recognition application to the operating system in response to the received voice message; and
      providing an appropriate manual input event message from the operating system to the voice recognition application in response to the simulated manual input event, wherein the voice recognition application initiates control of a device responsive to the manual input event message.

8. The system of claim 7, wherein the voice message is provided by the operating system in response to a voice input.

9. The system of claim 8, further including:
   a microphone for providing the voice input to the processor.

10. The system of claim 7, wherein the simulated manual input event is generated by an operating system call function.

11. The system of claim 10, wherein the system call function synthesizes a hardware input.

12. The system of claim 10, wherein the operating system is a Windows CE operating system and the system call function is a keybd_event function.

13. The system of claim 10, wherein the operating system is a Windows CE operating system.

14. A voice responsive automotive system that controls a motor vehicle accessory in response to both a manual input and a voice input, the system comprising:
   a processor;
   a memory subsystem for storing information coupled to the processor; and
   processor executable code including an operating system and a voice recognition application for causing the processor to perform the steps of:
      providing a voice message from the operating system to the voice recognition application;
      providing an appropriate simulated manual input event from the voice recognition application to the operating system in response to the received voice message; and
      providing an appropriate manual input event message from the operating system to the voice recognition application in response to the simulated manual input event, wherein the voice recognition application initiates control of a radio responsive to the manual input event message.

15. The system of claim 14, wherein the voice message is provided by the operating system in response to a voice input.

16. The system of claim 15, further including:
a microphone for providing the voice input to the processor.

17. The system of claim 14, wherein the simulated manual input event is generated by an operating system call function.

18. The system of claim 17, wherein the operating system is a Windows CE operating system and the system call function is a keybd_event function.

19. The system of claim 17, wherein the operating system is a Windows CE operating system.

20. The system of claim 17, wherein the system call function synthesizes a hardware input.

21. The system of claim 14, wherein the motor vehicle accessory is a radio.

* * * * *